United States Patent
Chadwick

(10) Patent No.: US 7,594,354 B1
(45) Date of Patent: Sep. 29, 2009

(54) PORTABLE FISHING POLE AND BINOCULARS SUPPORT APPARATUS AND ASSOCIATED METHOD

(76) Inventor: Karen Chadwick, P.O. Box 376, Interlachen, FL (US) 32148

( * ) Notice: Subject to any disclaimer, the term of this patent is extended or adjusted under 35 U.S.C. 154(b) by 118 days.

(21) Appl. No.: 11/881,710

(22) Filed: Jul. 27, 2007

Related U.S. Application Data

(60) Provisional application No. 60/820,819, filed on Jul. 31, 2006.

(51) Int. Cl.
*A01K 97/10* (2006.01)
(52) U.S. Cl. .................. 43/21.2; 224/922; 224/666; 224/669; 224/678; 224/258; 224/268; 224/269
(58) Field of Classification Search .............. 43/21.2; 224/922, 666, 669, 678, 257, 258, 268, 269, 224/913; 116/137 R; 446/202, 204
See application file for complete search history.

(56) References Cited

U.S. PATENT DOCUMENTS

| | | | | | |
|---|---|---|---|---|---|
| 250,083 | A | * | 11/1881 | Leet | 446/204 |
| 1,198,202 | A | * | 9/1916 | Drinkard | 43/21.2 |
| 1,779,795 | A | * | 10/1930 | Backstatter | 116/137 R |
| 1,955,815 | A | * | 4/1934 | Lauterbach | 446/204 |
| 2,053,982 | A | * | 9/1936 | Weiss | 116/137 R |
| 2,260,059 | A | * | 10/1941 | Sears | 43/17 |
| 2,271,136 | A | * | 1/1942 | Geiger | 224/922 |
| 2,273,136 | A | * | 2/1942 | Orech et al. | 224/268 |
| 2,288,442 | A | * | 6/1942 | Felton | 224/922 |
| 2,298,694 | A | * | 10/1942 | Haislip | 224/922 |
| 2,356,209 | A | * | 8/1944 | Brilhart | 224/268 |
| 2,480,129 | A | * | 8/1949 | Gebler | 224/913 |
| 2,499,117 | A | * | 2/1950 | Smith | 43/21.2 |
| 2,529,285 | A | * | 11/1950 | Felton | 224/922 |
| 2,537,456 | A | * | 1/1951 | Goss | 224/922 |
| 2,543,703 | A | * | 2/1951 | Pelto | 224/913 |
| 2,572,889 | A | * | 10/1951 | Strykower | 224/258 |
| 2,574,143 | A | * | 11/1951 | Colby | 224/268 |
| 2,608,784 | A | * | 9/1952 | Lando | 43/17 |
| 2,666,408 | A | * | 1/1954 | Riviere | 116/137 R |
| 2,812,123 | A | * | 11/1957 | Girton | 224/913 |
| 2,846,129 | A | * | 8/1958 | O'Brien | 224/922 |
| 2,877,598 | A | * | 3/1959 | Seron | 446/204 |
| 2,911,694 | A | * | 11/1959 | Seron | 446/204 |
| 2,947,456 | A | * | 8/1960 | Seron | 224/268 |

(Continued)

FOREIGN PATENT DOCUMENTS

FR 2887403 A1 * 12/2006

(Continued)

*Primary Examiner*—Darren W Ark

(57) ABSTRACT

A portable fishing pole and binoculars support apparatus includes a flexible shock cord with adjacently disposed first and second ends respectively. Such a shock cord further includes a cable crimp directly attached thereto such that a loop is formed in a medial portion of the shock cord. The support apparatus further includes a substantially S-shaped holder removably secured to the shock cord. Such a holder is formed from rigid and durable material such that the holder maintains a fixed shape during operating conditions. The holder includes a deformably resilient and cushioned material statically affixed to an inner surface of a selected curved portion of the holder. The support apparatus further includes an audible signaling device attached to the shock cord and a mechanism for adjustably attaching the apparatus about a user neck during operating conditions.

9 Claims, 12 Drawing Sheets

U.S. PATENT DOCUMENTS

| | | | | |
|---|---|---|---|---|
| 2,973,125 | A * | 2/1961 | Parry | 224/922 |
| 3,186,611 | A * | 6/1965 | Sonderman | 224/258 |
| 3,266,464 | A * | 8/1966 | Davis | 224/258 |
| 3,282,482 | A * | 11/1966 | Scharsu | 224/922 |
| 3,286,751 | A * | 11/1966 | Dishart | 224/666 |
| 3,326,431 | A * | 6/1967 | Belleni | 224/267 |
| 3,444,599 | A * | 5/1969 | Amon | 24/601.2 |
| 3,501,074 | A * | 3/1970 | Emerick | 224/913 |
| 3,661,308 | A * | 5/1972 | Walters | 224/258 |
| 3,749,294 | A * | 7/1973 | Johnston | 224/922 |
| 3,782,614 | A * | 1/1974 | Campisi | 224/909 |
| 3,797,075 | A * | 3/1974 | Seron | 24/370 |
| 3,847,315 | A * | 11/1974 | Bianchi | 224/616 |
| 3,874,573 | A * | 4/1975 | Fruscella et al. | 43/21.2 |
| 4,020,551 | A * | 5/1977 | Lindqvist | 224/604 |
| 4,168,022 | A * | 9/1979 | Brewer | 224/257 |
| 4,202,127 | A * | 5/1980 | Marek | 43/42.31 |
| D262,497 | S * | 1/1982 | Chan | D3/229 |
| 4,431,122 | A * | 2/1984 | Garmong | 224/268 |
| 4,569,466 | A * | 2/1986 | Webber | 224/922 |
| 4,739,914 | A * | 4/1988 | Pothetes | 224/922 |
| 4,764,145 | A * | 8/1988 | Kirby | 446/202 |
| 4,768,689 | A * | 9/1988 | Davis | 224/268 |
| 4,779,777 | A * | 10/1988 | Johnson et al. | 224/666 |
| 4,802,612 | A * | 2/1989 | Anderson | 224/922 |
| 4,828,152 | A * | 5/1989 | Pepping | 43/21.2 |
| 4,896,806 | A * | 1/1990 | Sanchez, Jr. | 224/678 |
| 4,898,311 | A * | 2/1990 | Boyer | 224/257 |
| 4,915,104 | A * | 4/1990 | Marcy | 128/207.18 |
| 4,936,499 | A * | 6/1990 | Gulley | 224/669 |
| 5,024,018 | A * | 6/1991 | Ferrigno | 43/21.2 |
| 5,040,324 | A * | 8/1991 | Rivera et al. | 224/922 |
| 5,123,578 | A * | 6/1992 | Morse | 43/21.2 |
| 5,165,423 | A * | 11/1992 | Fowler et al. | 446/202 |
| 5,233,781 | A * | 8/1993 | Bigelow | 43/17 |
| 5,244,135 | A * | 9/1993 | Nelson | 224/257 |
| 5,246,154 | A * | 9/1993 | Adams et al. | 224/257 |
| 5,360,149 | A * | 11/1994 | Lucot | 224/257 |
| 5,416,956 | A * | 5/1995 | Rubin | 24/601.4 |
| 5,427,291 | A * | 6/1995 | Smith | 224/258 |
| 5,520,312 | A * | 5/1996 | Maddox | 43/21.2 |
| 5,571,228 | A * | 11/1996 | McMurtrie | 43/21.2 |
| 5,573,167 | A * | 11/1996 | Bebb et al. | 43/21.2 |
| 5,644,794 | A * | 7/1997 | Hull et al. | 224/909 |
| 5,662,251 | A * | 9/1997 | Rossiter | 43/21.2 |
| 5,664,721 | A * | 9/1997 | Homeyer | 224/922 |
| 5,772,091 | A * | 6/1998 | Lackner | 224/265 |
| 5,797,212 | A * | 8/1998 | Kistner et al. | 43/21.2 |
| 5,816,464 | A * | 10/1998 | Seiler | 224/257 |
| 5,826,534 | A * | 10/1998 | Huang | 116/137 R |
| 5,909,833 | A * | 6/1999 | Smith | 224/577 |
| 5,913,479 | A * | 6/1999 | Westwood, III | 24/600.9 |
| 5,915,942 | A * | 6/1999 | Ratliffe | 43/21.2 |
| 5,950,896 | A * | 9/1999 | Theodore | 224/647 |
| 5,992,717 | A * | 11/1999 | Clewes et al. | 43/21.2 |
| 6,003,746 | A * | 12/1999 | Richardson | 43/21.2 |
| 6,029,870 | A * | 2/2000 | Giacona, III | 224/258 |
| 6,029,872 | A * | 2/2000 | Ellington | 43/21.2 |
| 6,065,238 | A * | 5/2000 | Carter et al. | 43/4 |
| 6,095,884 | A * | 8/2000 | Wiley | 446/202 |
| 6,109,490 | A * | 8/2000 | Caluori | 446/204 |
| 6,125,998 | A * | 10/2000 | Batista | 224/607 |
| 6,129,251 | A * | 10/2000 | Lajoie | 43/21.2 |
| 6,131,780 | A * | 10/2000 | Becker | 224/269 |
| 6,138,976 | A * | 10/2000 | Fahringer, Sr. | 224/922 |
| 6,141,898 | A * | 11/2000 | Shelton | 43/21.2 |
| 6,185,856 | B1 * | 2/2001 | Yakabe | 43/21.2 |
| 6,192,558 | B1 * | 2/2001 | Badura | 24/599.1 |
| 6,237,821 | B1 * | 5/2001 | Owen | 43/21.2 |
| 6,250,247 | B1 * | 6/2001 | Chu | 116/137 R |
| 6,267,276 | B1 * | 7/2001 | Cook | 224/922 |
| 6,269,990 | B1 * | 8/2001 | Gray | 43/21.2 |
| 6,315,179 | B1 * | 11/2001 | Hillis | 224/268 |
| 6,370,810 | B1 * | 4/2002 | Widerman | 43/21.2 |
| 6,382,407 | B1 * | 5/2002 | Chao | 224/257 |
| 6,493,982 | B1 * | 12/2002 | Macaluso | 43/21.2 |
| 6,591,540 | B1 * | 7/2003 | Chargois | 43/21.2 |
| 6,591,542 | B1 * | 7/2003 | Jordan | 43/21.2 |
| 6,598,273 | B2 * | 7/2003 | Buettell | 224/271 |
| 6,616,024 | B1 * | 9/2003 | Perry | 224/604 |
| 6,626,333 | B2 * | 9/2003 | Levesque et al. | 224/269 |
| 6,648,191 | B2 * | 11/2003 | Giggleman | 224/258 |
| 6,698,377 | B1 * | 3/2004 | Topman et al. | 116/137 R |
| 6,709,309 | B1 * | 3/2004 | Bishop et al. | 446/202 |
| 6,729,064 | B2 * | 5/2004 | Congialosi | 43/21.2 |
| 6,752,305 | B2 * | 6/2004 | Shattuck | 224/269 |
| 6,805,270 | B1 * | 10/2004 | Fraser | 224/922 |
| 6,824,031 | B2 * | 11/2004 | McKenzie | 224/666 |
| 6,869,146 | B2 * | 3/2005 | Gollahon | 43/21.2 |
| 6,923,357 | B2 * | 8/2005 | Smith | 43/21.2 |
| 6,926,184 | B2 * | 8/2005 | Hancock et al. | 224/637 |
| 6,926,578 | B1 * | 8/2005 | Casias et al. | 446/202 |
| 6,983,870 | B2 * | 1/2006 | Hancock et al. | 224/258 |
| 7,013,596 | B1 * | 3/2006 | Moore | 43/21.2 |
| 7,037,167 | B2 * | 5/2006 | Primos et al. | 446/204 |
| 2001/0047607 | A1 * | 12/2001 | Harvanek | 43/21.2 |
| 2002/0139036 | A1 * | 10/2002 | Smith | 43/21.2 |
| 2002/0152669 | A1 * | 10/2002 | Harvanek | 43/21.2 |
| 2003/0033970 | A1 * | 2/2003 | Hills et al. | 116/137 R |
| 2003/0051388 | A1 * | 3/2003 | Barnes et al. | 43/21.2 |
| 2003/0178460 | A1 * | 9/2003 | Shattuck | 224/269 |
| 2003/0188472 | A1 * | 10/2003 | Congialosi | 43/21.2 |
| 2005/0050695 | A1 * | 3/2005 | Mackey et al. | 24/598.4 |
| 2005/0199661 | A1 * | 9/2005 | Johnson | 224/257 |
| 2006/0151563 | A1 * | 7/2006 | Bussard | 224/664 |
| 2007/0044366 | A1 * | 3/2007 | Walko | 43/21.2 |
| 2007/0138227 | A1 * | 6/2007 | Rickman | 224/669 |
| 2007/0149087 | A1 * | 6/2007 | Keller et al. | 446/202 |
| 2007/0214707 | A1 * | 9/2007 | Walko | 43/21.2 |
| 2007/0234631 | A1 * | 10/2007 | Parkison | 43/21.2 |
| 2008/0017097 | A1 * | 1/2008 | Eventoff | 116/137 R |
| 2008/0203127 | A1 * | 8/2008 | Castillo-Garrison | 224/257 |
| 2009/0065537 | A1 * | 3/2009 | Yanagisawa | 224/258 |

FOREIGN PATENT DOCUMENTS

| | | | |
|---|---|---|---|
| GB | 2039701 A * | 8/1980 | |
| GB | 2048633 A * | 12/1980 | |
| GB | 2113982 A * | 8/1983 | |
| GB | 2123675 A * | 2/1984 | |
| GB | 2274049 A * | 7/1994 | |
| GB | 2366989 A * | 3/2002 | |
| JP | 10248464 A * | 9/1998 | |
| JP | 2000157135 A * | 6/2000 | |
| JP | 2001299174 A * | 10/2001 | |
| JP | 2002306040 A * | 10/2002 | |
| JP | 2008011776 A * | 1/2008 | |

* cited by examiner

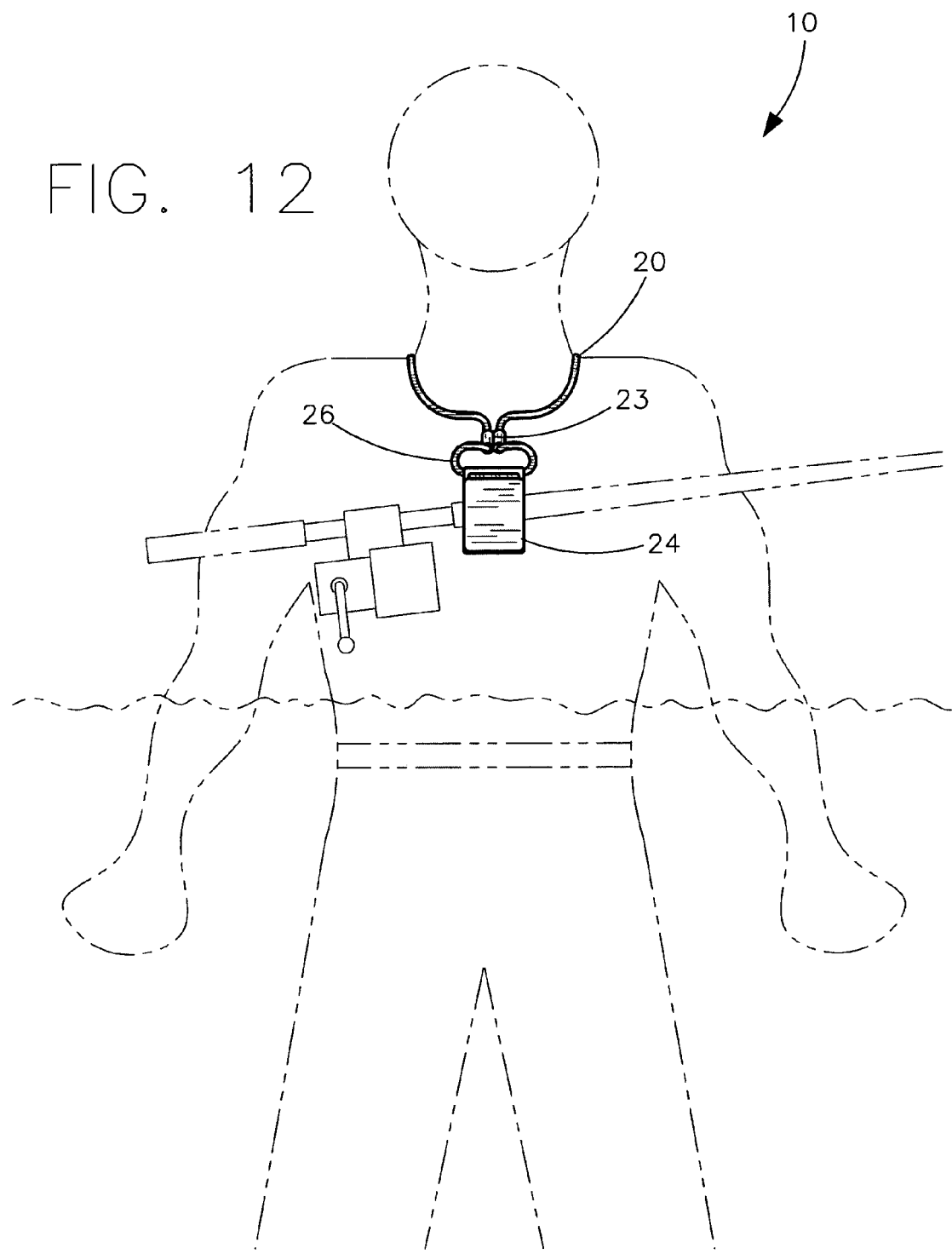

PORTABLE FISHING POLE AND BINOCULARS SUPPORT APPARATUS AND ASSOCIATED METHOD

CROSS REFERENCE TO RELATED APPLICATIONS

This application claims the benefit of U.S. Provisional Application No. 60/820,819, filed Jul. 31, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to support apparatuses and, more particularly, to a portable fishing pole and binoculars support apparatus for assisting a user to support a fishing pole and binoculars on the user body while allowing the user hands to remain unencumbered.

2. Prior Art

In general, before a fisher-person lands a fish caught at a fishing hook, he or she swings the fishing rod vertically and laterally in accordance with the movement of the fish in the water to fatigue the fish. During this time, the fisher-person holds the fishing rod in his or her arms, or directly supports the base end of the fishing rod on his or her stomach or abdomen. It is not easy for the fisher-person to swing the fishing rod vertically and laterally, while holding the fishing rod in his or her arms, or directly supporting the base end of the fishing rod on his or her stomach or abdomen, particularly when he or she is landing a large fish. Moreover, this swinging action of the fishing rod may damage clothes of the fisher-person.

U.S. Pat. No. 6,029,872 to Ellington discloses a light spinning rod holster that mounts to the waistband of a user's swimsuit. It is constructed of lightweight corrosion-resistant plastic. At one end of the light spinning rod holster, the plastic is folded into a clip shape, which secures the light spinning rod holster to the waistband of a swimsuit. Disposed along the length of the light spinning rod holster is a tubular rod holder open at each end with a slot to secure a spinning rod into place in the tubular rod holder. An adjustable belt affixed to the bottom of the light spinning rod holster holds it in place against the thigh of a user and helps support some of the weight of the device and any spinning rod fixed therein. Unfortunately, this prior art example is not designed for holding all types of fishing rods.

U.S. Pat. No. 6,185,856 to Yakabe discloses a support for a fishing rod that includes an abutment plate, a mounting device for mounting the abutment plate on the body of a fisher-person, a support base mounted on the abutment plate, and a support tube formed of a coil spring with a flexibility and secured to the support base at an inclined attitude with its tip end directed upwards. The support tube is formed so that a base end portion of the fishing rod fitted in the support tube is rotatably supported on an inner peripheral surface of the support tube. The fishing rod can be swung vertically and laterally by the flexing of the support tube. A widened portion is formed at the tip end of the support tube for supporting an annular shoulder portion connected to an upper end of the base end portion of the fishing rod, whereby a flexible portion in which the fishing rod is not fitted, remains. Thus, the fisher-person can support the fishing rod easily and stably at a usual upward angle using one hand by fitting the base end portion of the fishing rod into the support tube with the abutment plate put into abutment against the body of the fisher-person. In addition, the fisher-person can guide the fishing rod to an inner peripheral surface of the fishing rod to freely rotate the fishing rod, and moreover, can freely and stably swing the fishing rod vertically and laterally by only one hand, while suitably flexing the support tube formed of the coil spring. Unfortunately, this prior art example always requires use of at least one user hand during fishing.

U.S. Pat. No. 6,805,270 to Fraser discloses a fisherman's utility rod holster which includes a first flat sheet of sturdy material and a second flat sheet of sturdy material shaped into a pair of pockets for receiving a measuring tape and a measuring scale. The pockets are attached to an upper center portion of the base. A D-ring is secured to a lower left portion of the base by a tab that is folded and secured to a back face of the base. An elongated channel having a plurality of vertically aligned slots is formed along the right side portion of the base. A rod support hook formed with a wide U-shaped portion for receiving a fishing rod handle and a narrow inverted U-shaped retaining portion that is removably secured within one of the vertically aligned slots. Elongated slots are formed in the top portion of the base above the compartments for receiving a belt. Unfortunately, this prior art example is not designed for supporting other tools used by fishermen during a trip.

Accordingly, the present invention is disclosed in order to overcome the prior art shortcomings. The present invention satisfies such a need by providing an apparatus that is convenient and easy to use, lightweight yet durable in design, and designed for assisting a user to support a fishing pole and binoculars on the user body while allowing the user hands to remain unencumbered. The portable fishing pole and binoculars support apparatus provides an advantageous means for keeping a user fishing rod within reach for quick and convenient casting. In addition, the apparatus is lightweight and designed with a foam grip for ensuring rod protection and stability. Further, the apparatus may be adjusted to hold various fishing rod diameters. The present invention is simple to use, inexpensive, and designed for many years of repeated use.

BRIEF SUMMARY OF THE INVENTION

In view of the foregoing background, it is therefore an object of the present invention to provide a mechanism for assisting a user to support a fishing pole and binoculars on the user body while allowing the user hands to remain unencumbered. These and other objects, features, and advantages of the invention are provided by a portable fishing pole and binoculars support apparatus.

A portable fishing pole and binoculars support apparatus includes a flexible shock cord with adjacently disposed first and second ends respectively. Such a shock cord further includes a cable crimp directly attached thereto such that a loop is effectively formed in a medial portion of the shock cord.

The support apparatus further includes a substantially S-shaped holder removably secured to the shock cord. Such a holder is conveniently formed from rigid and durable material such that the holder maintains a fixed shape during operating conditions. The holder includes a deformably resilient and cushioned material statically affixed to an inner surface of a selected curved portion of the holder. Such cushioned material is advantageously abutted directly against an existing object interfitted within the selected curved portion such that the cushioned material prohibits at least one of the existing fishing pole and the existing binoculars from prematurely and undesirably exiting the holder during operating conditions. Another curved portion of the holder is attached to the loop of the shock cord such that the loop is interfitted within the another curved portion and thereby maintains the cushioned material of the selected curved portion in an upwardly facing position during operating conditions.

The support apparatus further includes an audible signaling device attached to the shock cord. Such an audible signaling device may be a whistle that effectively includes a female part directly attached to the first and second ends respectively of the shock cord and a male part removably secured within the female part. Such a male part is permanently attached to the female part and employed as desired by the user.

The support apparatus further includes a mechanism for adjustably attaching the apparatus about a user neck during operating conditions. Such an attaching mechanism is slidably attached to the shock cord and includes a cylindrical barrel lock with an open top end and a closed bottom end respectively. Such a barrel lock conveniently has a hollow interior. The barrel lock further includes a pair of apertures formed in diametrically opposed outer surfaces of the barrel lock. Such respective apertures are located adjacent to the top end of the barrel lock, and each of the apertures aligns with the bore when the piston is interfitted within the barrel lock such that the shock cord is simultaneously penetrated through the apertures and the bore respectively. The barrel lock is slidably adjusted along a longitudinal length of the shock cord during operating conditions.

The attaching mechanism further includes a piston with a shaft removably interfitted within the hollow interior of the barrel lock. Such a piston is advantageously provided with a top end with a diameter that is equal to a diameter of the barrel lock. Such a top end is monolithically formed with the shaft, and such a shaft has a bore formed therethrough. Such a bore has a centrally registered axis oriented perpendicular to a longitudinal length of the shaft.

The attaching mechanism further includes a deformably resilient spring member interfitted within the hollow interior of the barrel lock. Such a spring member effectively has a bottom end abutted directly against the bottom end of the barrel lock and further has a top end extending upwardly and away from the bottom end thereof. Such a top end of the spring member is abutted directly against a bottom end of the piston when the piston is interfitted within the barrel lock. The spring member advantageously exerts a force against the bottom end of the piston and thereby causes the apertures and the bore to prohibit the barrel lock from prematurely and undesirably sliding along the longitudinal length of the shock cord during operating conditions.

A method for supporting an existing fishing pole and existing binoculars on a user body while allowing user hands to remain unencumbered includes the steps of providing a flexible shock cord with adjacently disposed first and second ends respectively and securing a substantially S-shaped holder to the shock cord. Such a holder is formed from rigid and durable material such that the holder maintains a fixed shape during operating conditions. The steps further include: attaching an audible signaling device to the shock cord; positioning the apparatus about the user neck during operating conditions; and positioning at least one of the existing fishing pole and the existing binoculars within the holder.

The method further includes the steps of: statically attaching a deformably resilient and cushioned material to an inner surface of a selected curved portion of the holder; abutting the cushioned material directly against at least one of the existing fishing pole and the existing binoculars interfitted within the selected curved portion such that the cushioned material prohibits the at least one fishing pole and the existing binoculars from prematurely and undesirably exiting the holder during operating conditions; and attaching another curved portion of the holder to the loop of the shock cord such that the loop is interfitted within another curved portion and thereby maintains the cushioned material of the selected curved portion in an upwardly facing position during operating conditions.

The method further includes the steps of: attaching a whistle to the first and second ends respectively of the shock cord; and employing the audible signaling device (whistle) when desired by the user to generate a whistling sound.

The method of further includes the step of providing a cylindrical barrel lock with an open top end and a closed bottom end respectively. Such a barrel lock has a hollow interior. The steps further include interfitting a piston provided with a shaft within the hollow interior of the barrel lock. Such a piston is provided with a top end with a diameter that is equal to a diameter of the barrel lock, and the top end is monolithically formed with the shaft. The shaft has a bore formed therethrough, and such a bore has a centrally registered axis oriented perpendicular to a longitudinal length of the shaft. The steps further include interfitting a deformably resilient spring member within the hollow interior of the barrel lock. Such a spring member has a bottom end abutted directly against the bottom end of the barrel lock and further has a top end extending upwardly and away from the bottom end thereof. The steps further include abutting the top end of the spring member directly against a bottom end of the piston when the piston is interfitted within the barrel lock.

The method further includes the step of providing a pair of apertures formed in diametrically opposed outer surfaces of the barrel lock. Such respective apertures are located adjacent to the top end of the barrel lock. The steps further include: aligning each of the apertures with the bore when the piston is interfitted within the barrel lock such that the shock cord is simultaneously penetrated through the apertures and the bore respectively; positioning the barrel lock along a longitudinal length of the shock cord during operating conditions; and prohibiting the barrel lock from prematurely and undesirably sliding along the longitudinal length of the shock cord during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 12 is a front elevational view of the S-shaped holder being used to support a fishing rod via the shock cord, in accordance with the present invention.

DETAILED DESCRIPTION OF THE INVENTION

Figure 1:
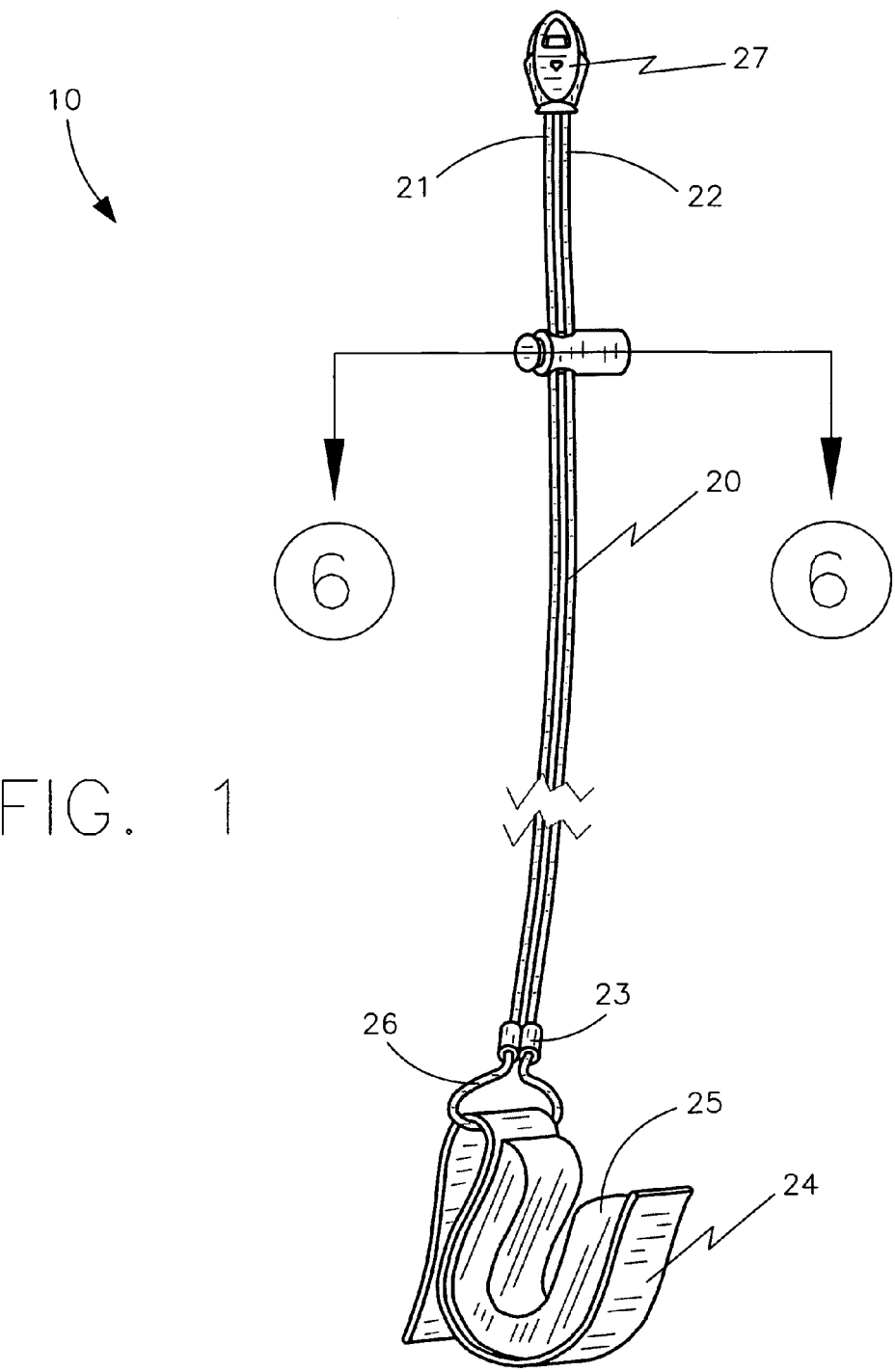
FIG. 1 is a perspective view of a portable fishing pole and binoculars support apparatus, in accordance with the present invention.
Figure 2:
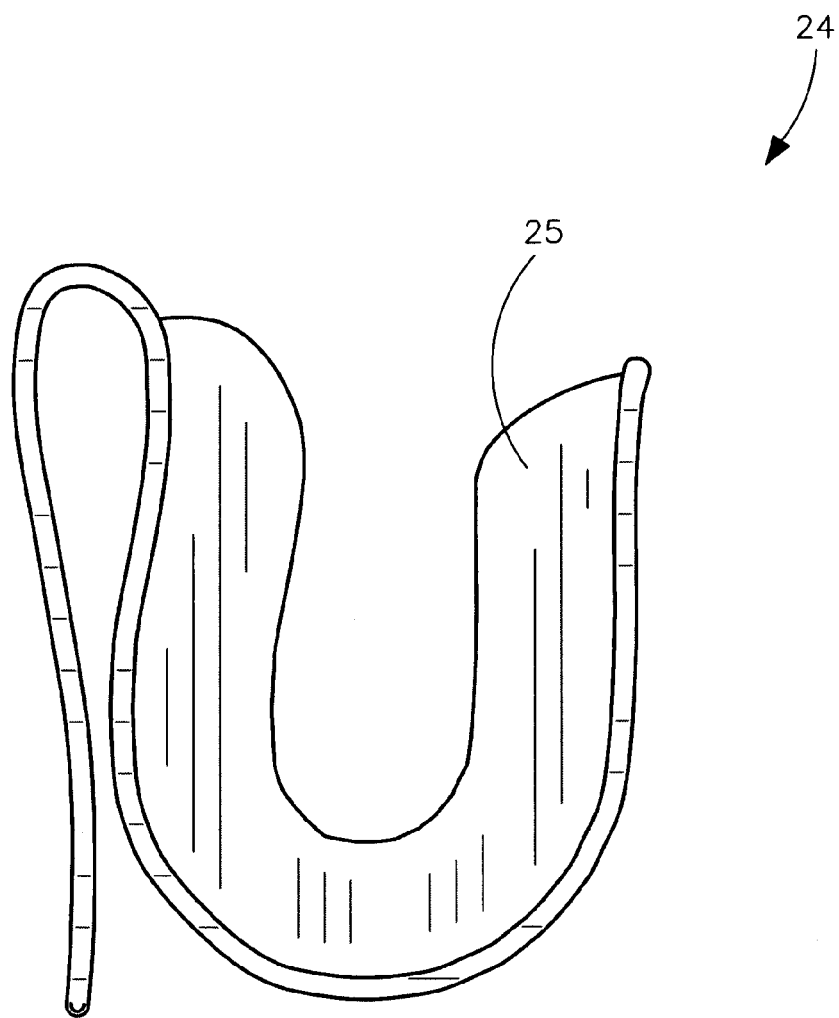
FIG. 2 is a side elevational view of the S-shaped holder, in accordance with the present invention.
Figure 3:
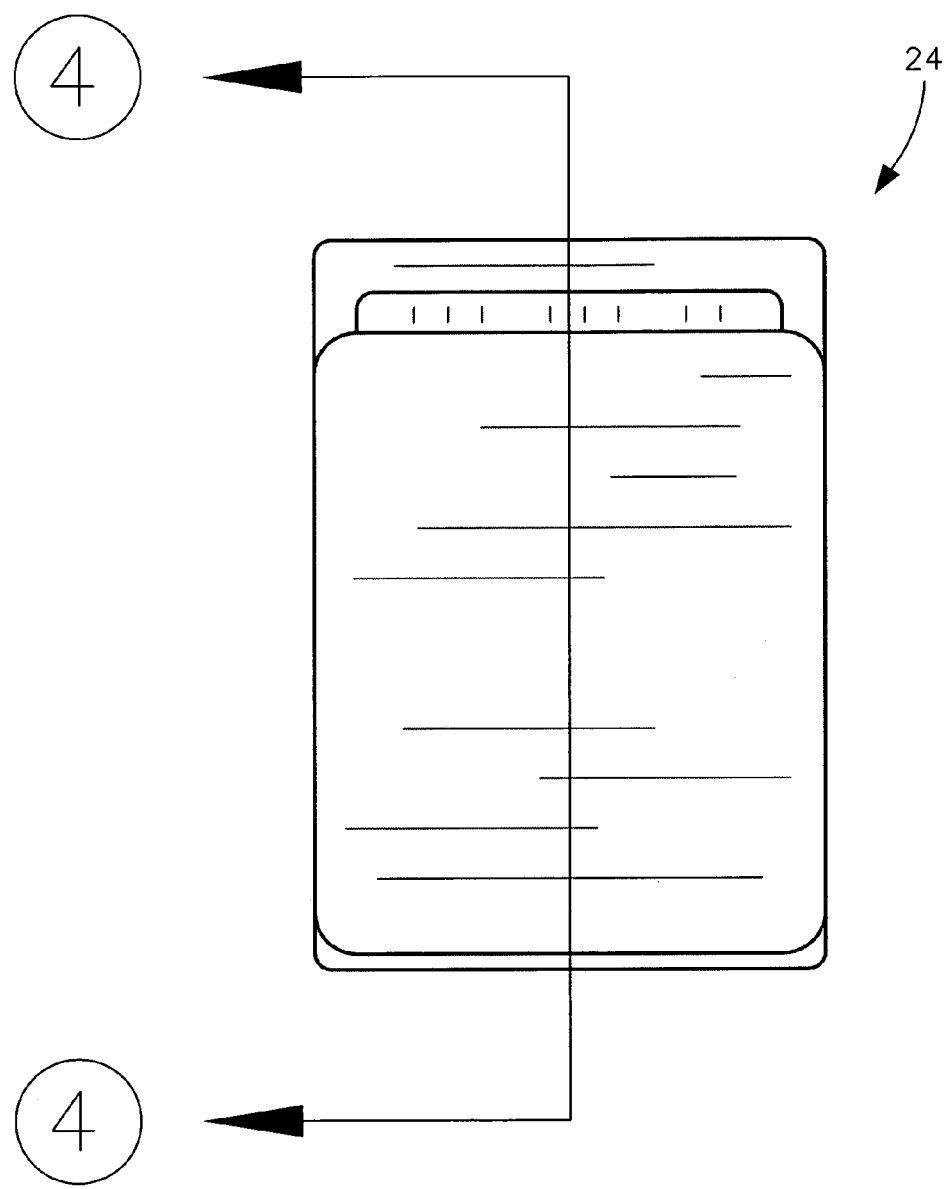
FIG. 3 is a top planar view of the S-shaped holder, as seen in FIG. 2.
Figure 4:
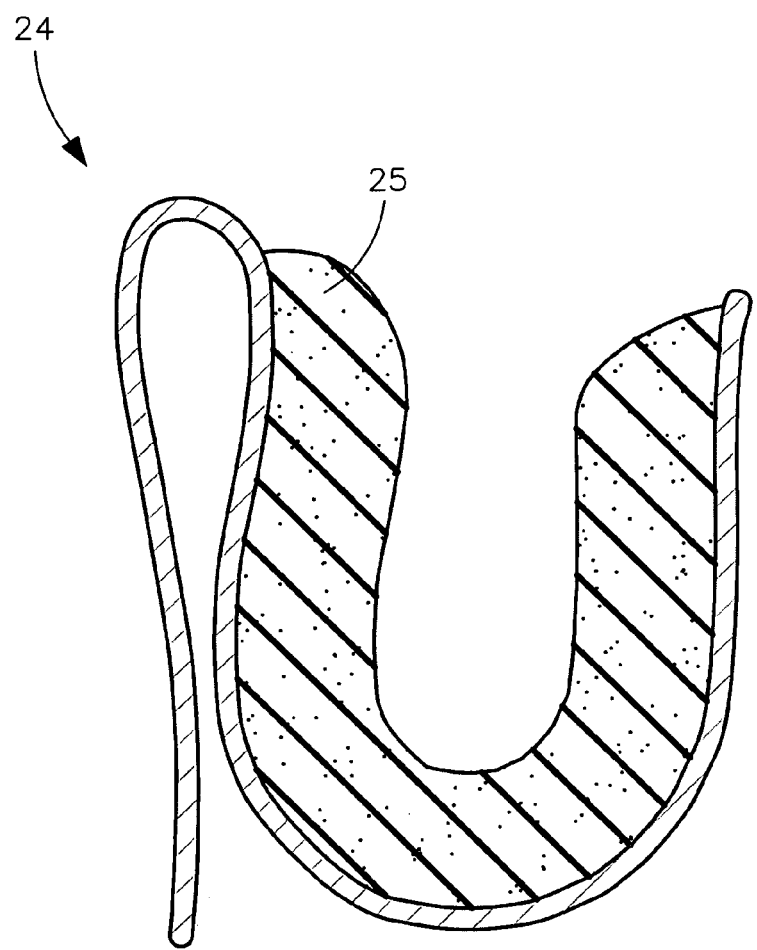
FIG. 4 is a cross sectional view of the S-shaped holder, taken along line 4-4, as seen in FIG. 3.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-12 by the reference numeral 10 and is intended to provide a mechanism for assisting a user to support a fishing pole and binoculars on the user body while allowing the user hands to remain unencumbered. It should be understood that the apparatus 10 may be used to support many different types of fishing equipment and should not be limited to supporting only those types of fishing equipment mentioned herein.

Figure 9:
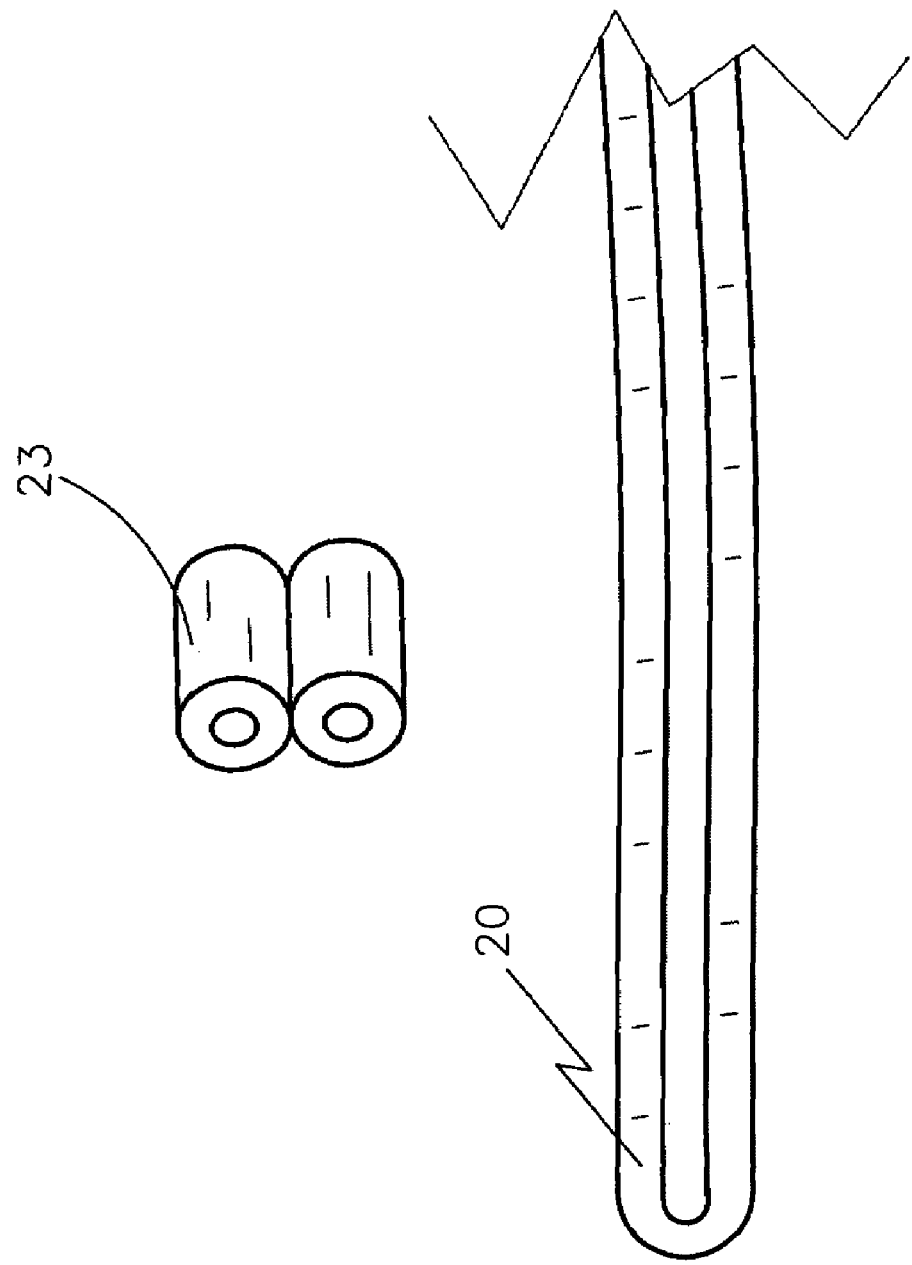
FIG. 9 is a perspective view of the shock cord and cable crimp, in accordance with the present invention.
Figure 10:
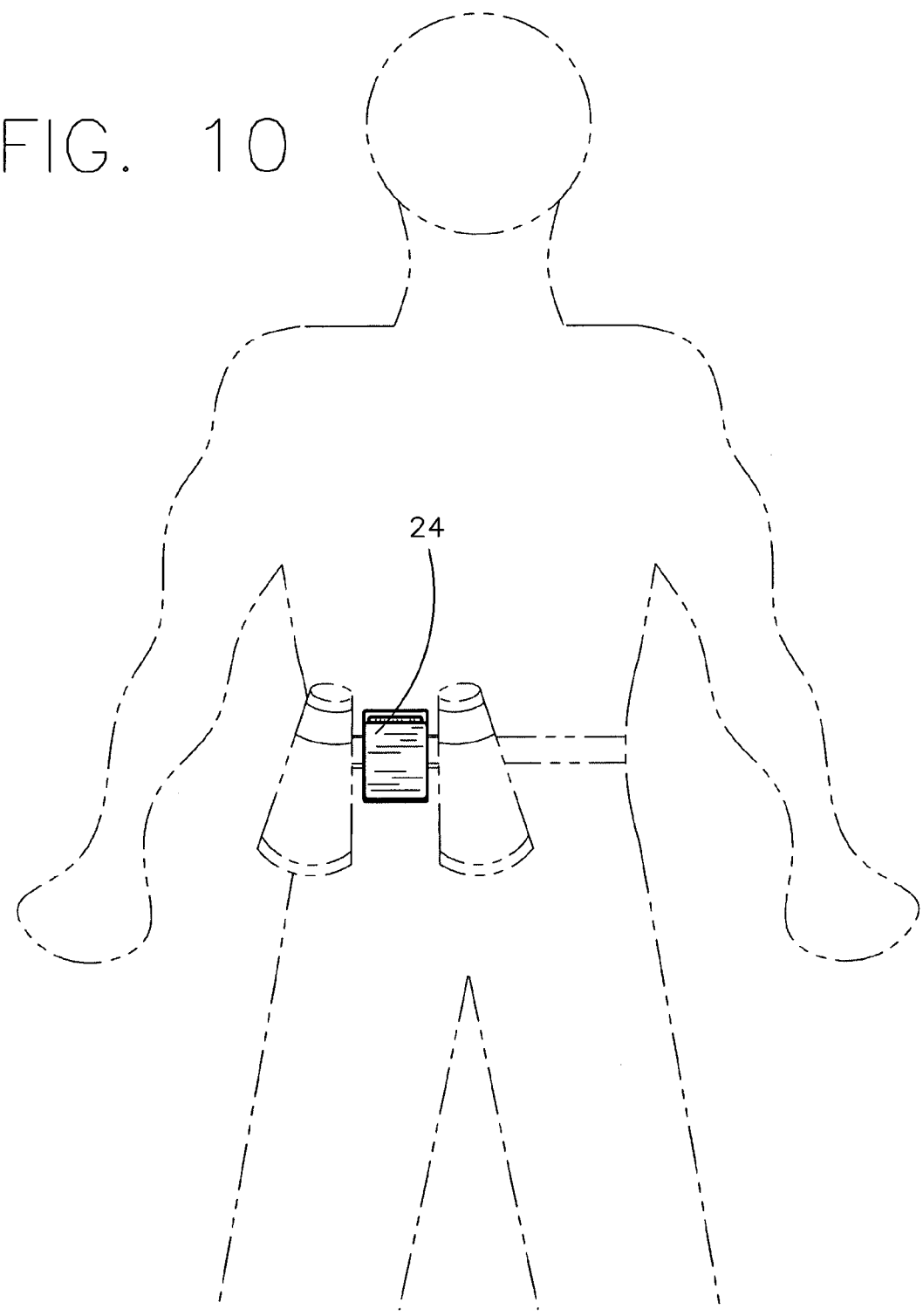
FIG. 10 is a front elevational view of the S-shaped holder being used to support binoculars via a user's waistband, in accordance with the present invention.
Figure 11:
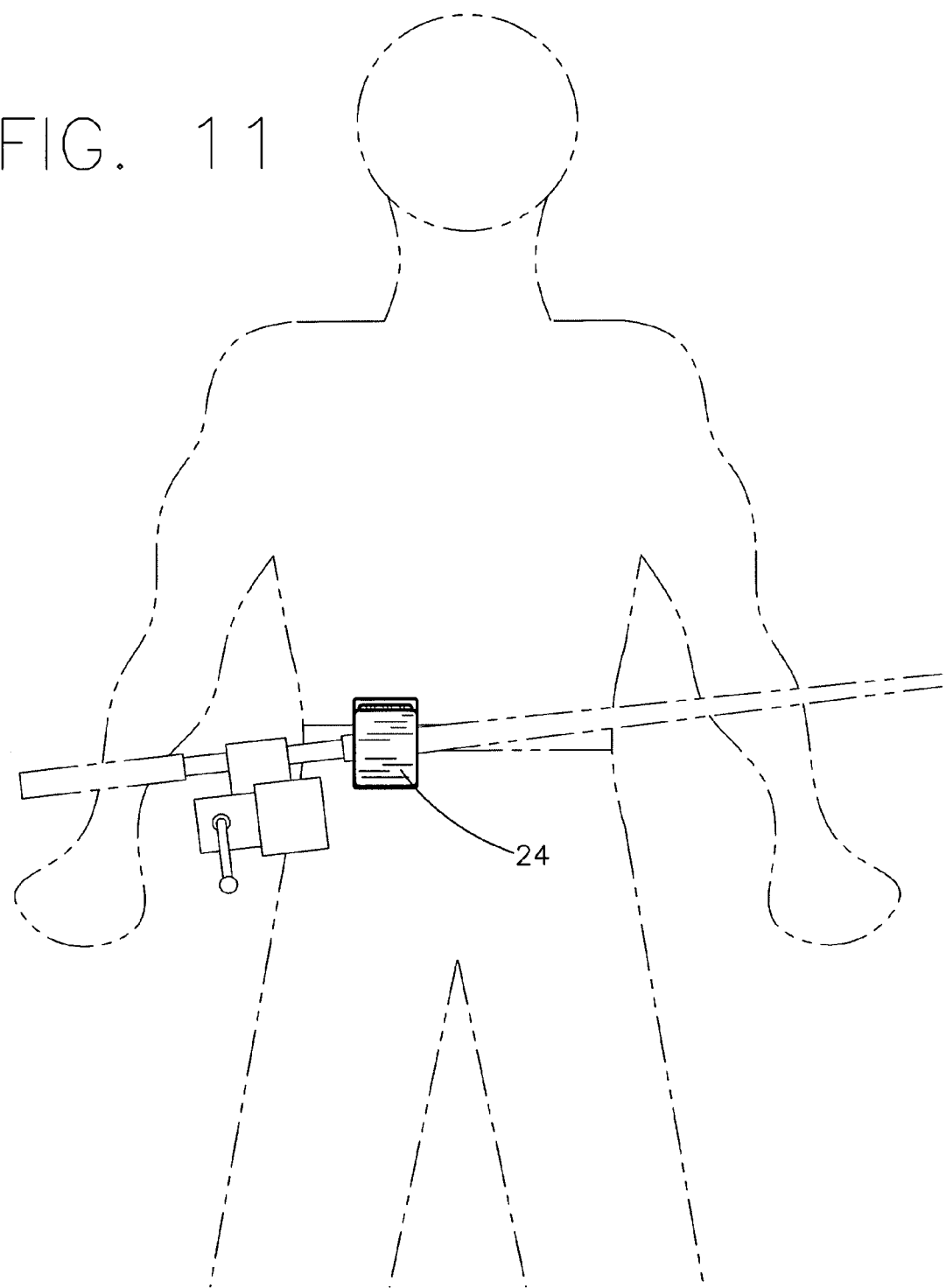
FIG. 11 is a front elevational view of the S-shaped holder being used to support a fishing rod via a user's waistband, in accordance with the present invention.

Referring to FIGS. 1, 9 and 12, a portable fishing pole and binoculars support apparatus includes a flexible shock cord 20 with adjacently disposed first and second ends 21, 22 respectively. Such a shock cord 20 further includes a cable crimp 23 directly attached thereto, without the use of intervening characters, which is essential such that a loop 26 is formed in a medial portion of the shock cord 20. The loop provides a mechanism for supporting an S-shaped holder on the flexible shock cord.

Referring to FIGS. 1, 2, 3, 4, 10, 11 and 12, the support apparatus further includes a substantially S-shaped holder 24 removably secured to the shock cord 20. Such a holder 24 is formed from rigid and durable material which is critical such that the holder 24 maintains a fixed shape during operating conditions. The holder 24 includes a deformably resilient and cushioned material 25 statically affixed to an inner surface of a selected curved portion of the holder. Such cushioned material 25 is abutted directly against, without the use of intervening characters, an existing object interfitted within the selected curved portion which is crucial such that the cushioned material 25 prohibits at least one of the existing fishing pole and the existing binoculars from prematurely and undesirably exiting the holder 24 during operating conditions. Another curved portion of the holder 24 is attached to the loop 26 of the shock cord 20 which is vital such that the loop 26 is interfitted within the another curved portion and thereby maintains the cushioned material 25 of the selected curved portion in an upwardly facing position during operating conditions. The S-shaped holder provides a mechanism for supporting a fishing rod on either the shock cord or on a user waist band.

Figure 7:
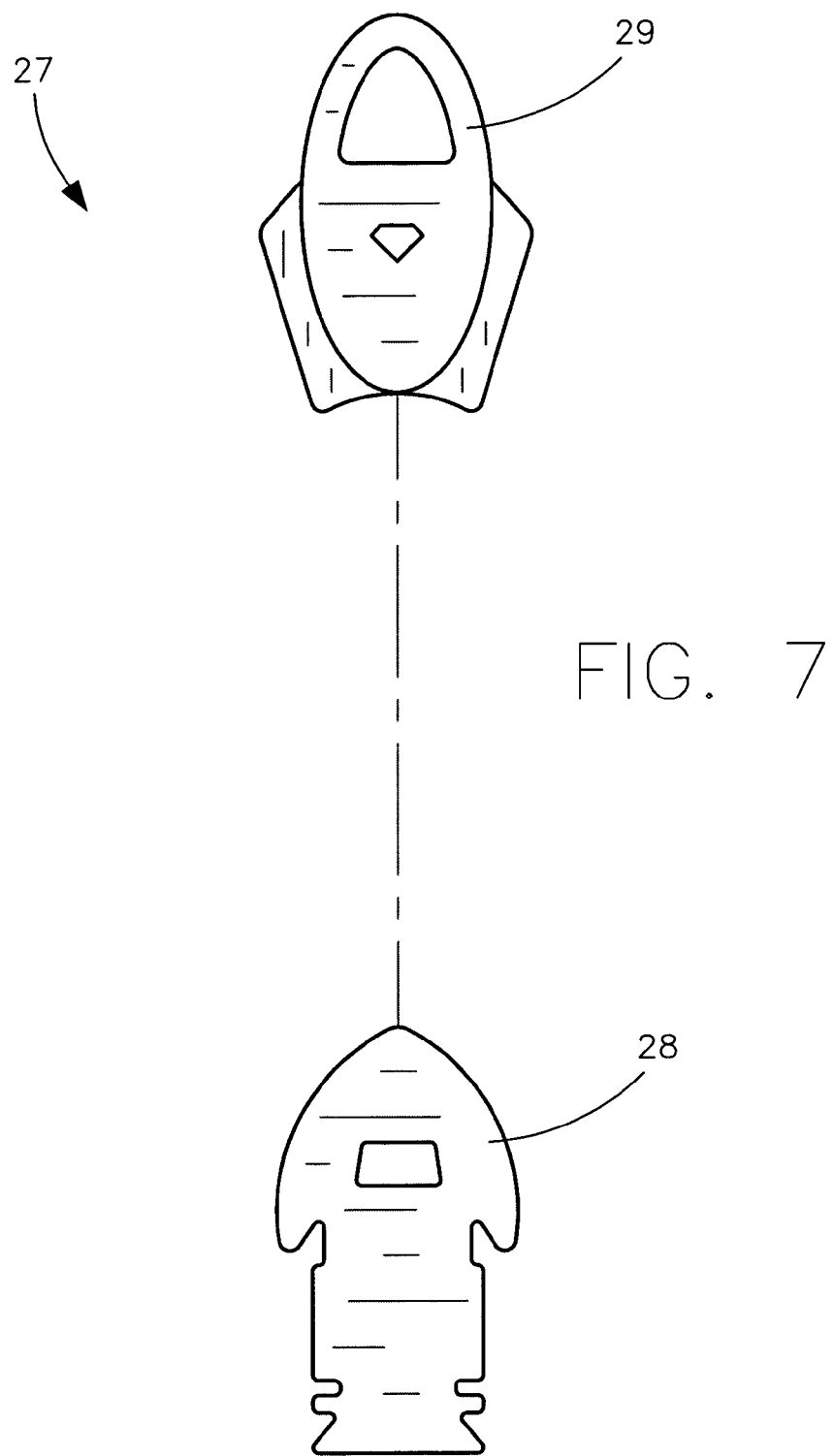
FIG. 7 is a front elevational view of the female part and the male part, respectively, of the audible signaling device, in accordance with the present invention.
Figure 8:
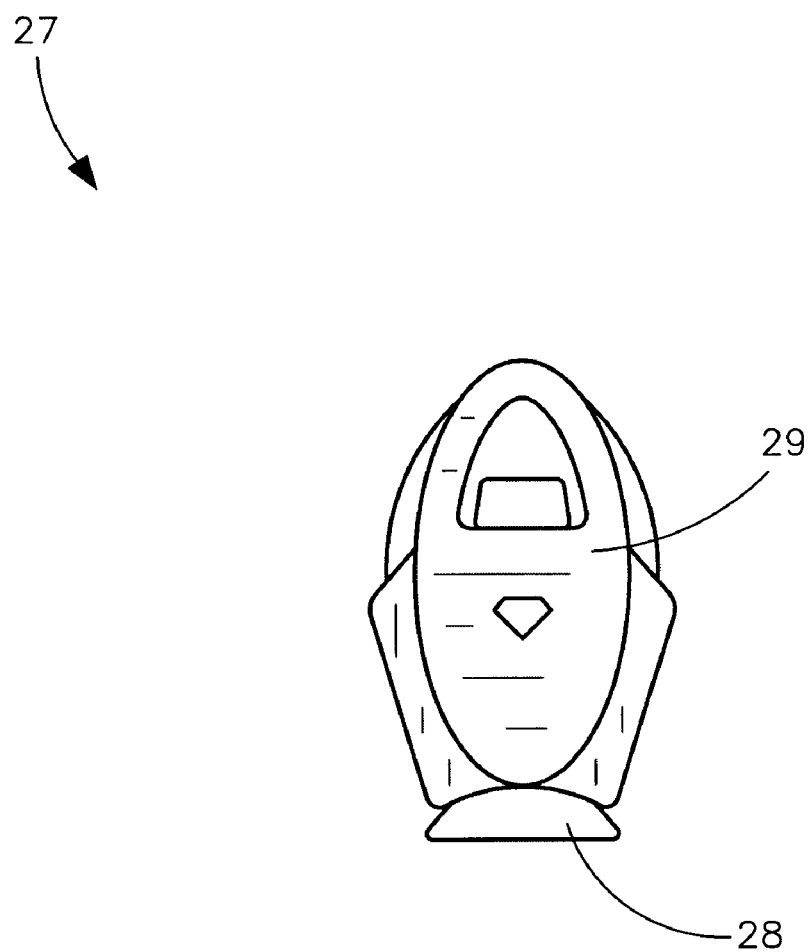
FIG. 8 is a front elevational view of an audible signaling device, in accordance with the present invention.

Referring to FIGS. 1, 7 and 8, the support apparatus further includes an audible signaling device 27 attached to the shock cord 20. Such an audible signaling device 27 includes a female part 28 directly attached, without the use of intervening elements, to the first and second ends 21, 22 respectively of the shock cord 20 and a male part 29 permanently secured to the female part 28. Such a male part 29 and female part 28 are employed as desired by the user to generate a whistling sound. The audible signaling device provides a mechanism for alerting passerby of a user's presence.

Figure 5:
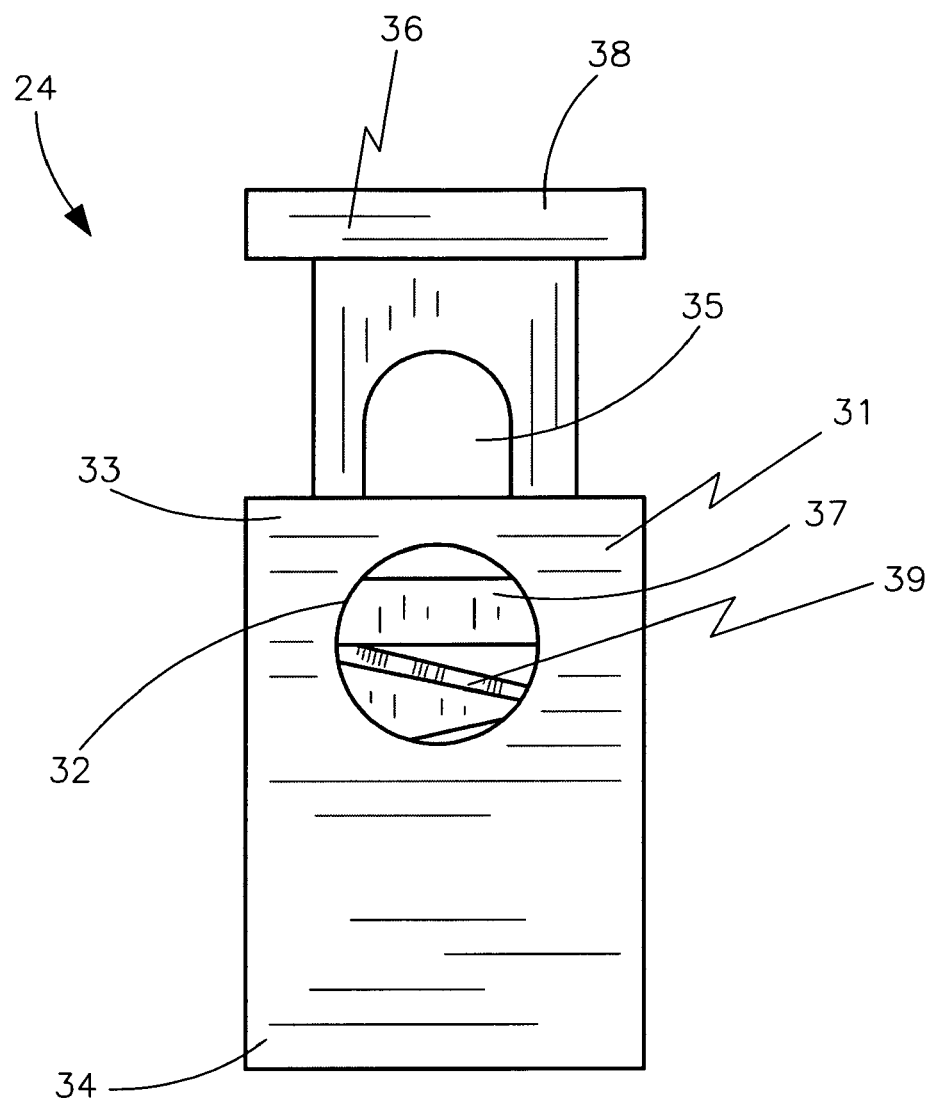
FIG. 5 is a top planar view of the attaching mechanism, in accordance with the present invention.
Figure 6:
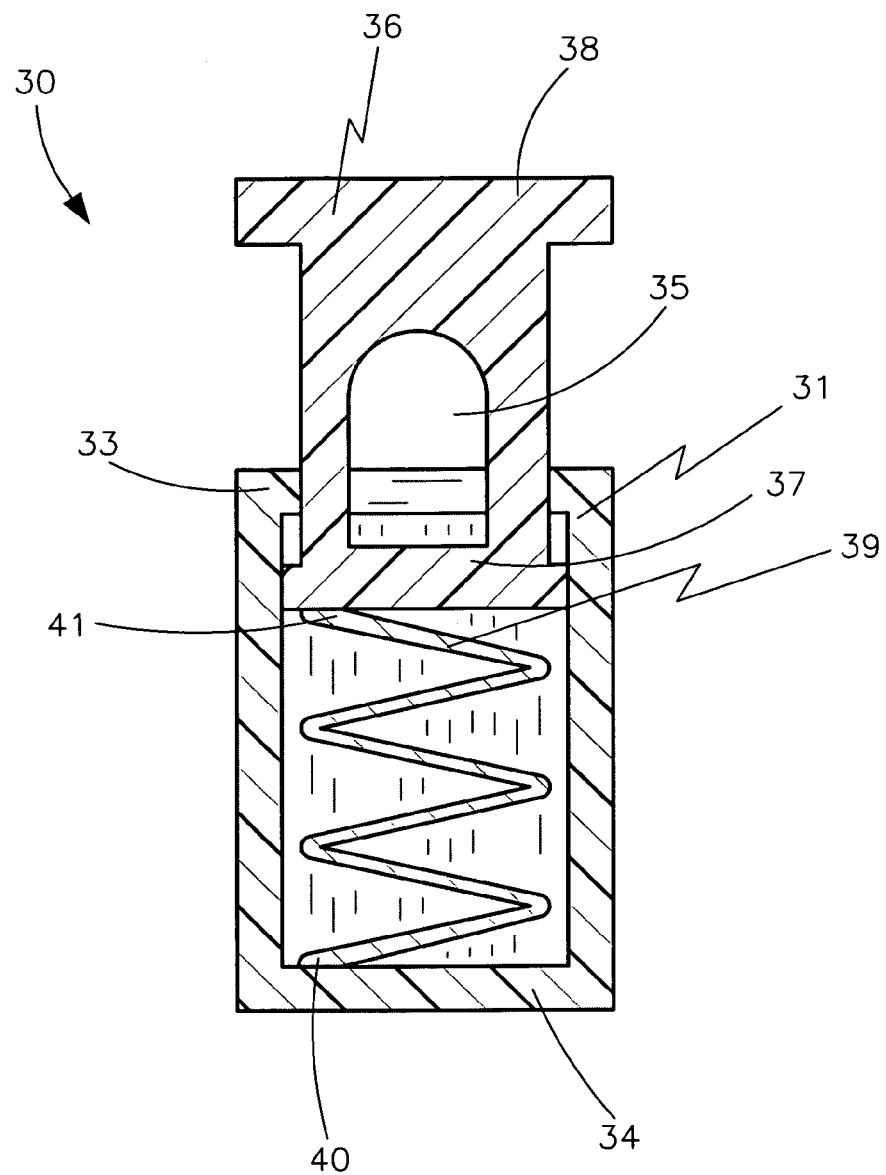
FIG. 6 is a cross sectional view of the attaching mechanism, taken along line 6-6, as seen in FIG. 1.

Referring to FIGS. 1, 5 and 6, the support apparatus further includes a mechanism for adjustably attaching the apparatus about a user neck during operating conditions. Such an attaching mechanism 30 is slidably attached to the shock cord 20 and includes a cylindrical barrel lock 31 with an open top end 33 and a closed bottom end 34 respectively. Such a barrel lock 31 has a hollow interior. The barrel lock 31 further includes a pair of apertures 32 formed in diametrically opposed outer surfaces of the barrel lock 31. Such respective apertures 32 are located adjacent to the top end 33 of the barrel lock 31, and each of the apertures 32 aligns with a bore 35 when a piston 36 is interfitted within the barrel lock 31 which is necessary such that the shock cord 20 is simultaneously penetrated through the apertures 32 and the bore 35 respectively. The barrel lock 31 is slidably adjusted along a longitudinal length of the shock cord 20 during operating conditions. The adjusting mechanism provides a mechanism for tightening or loosening the shock cord around a user's neck.

Referring again to FIGS. 1, 5 and 6, the attaching mechanism further includes a piston 36 with a shaft 37 removably interfitted within the hollow interior of the barrel lock 31. Such a piston 36 is provided with a top end 38 with a diameter that is equal to a diameter of the barrel lock 31. Such a top end 38 is monolithically formed with the shaft 37, and such a shaft 37 has a bore 35 formed therethrough. Such a bore 35 has a centrally registered axis oriented perpendicular to a longitudinal length of the shaft 37.

The attaching mechanism further includes a deformably resilient spring member 39 interfitted within the hollow interior of the barrel lock 31. Such a spring member 39 has a bottom end 40 abutted directly, without the use of intervening characters, against the bottom end of the barrel lock 31 and further has a top end 41 extending upwardly and away from the bottom end thereof. Such a top end of the spring member 39 is abutted directly, without the use of intervening characters, against a bottom end of the piston 36 when the piston 36 is interfitted within the barrel lock 31. The spring member 39 exerts a force against the bottom end of the piston 36 and thereby causes the apertures 32 and the bore 35 to prohibit the barrel lock 31 from prematurely and undesirably sliding along the longitudinal length of the shock cord 20 during operating conditions. The spring member provides a mechanism for activating or releasing the piston as needed to adjust the mechanism appropriately on the shock cord.

The shock cord provides the unexpected benefit of allowing a user to hang the S-shaped holder around a user's neck. In addition, the holder can be removed from the cord and attached directly to a waistband of the user pants, for example. In addition, the audible signal device provides the unexpected benefit of providing a user a mechanism for calling attention to oneself when necessary. Such benefits overcome the prior art shortcomings.

In use, a method for supporting an existing fishing pole and existing binoculars on a user body while allowing user hands to remain unencumbered includes the steps of providing a flexible shock cord 20 with adjacently disposed first and second ends 21, 22 respectively and securing a substantially S-shaped holder 24 to the shock cord 20. Such a holder 24 is formed from rigid and durable material such that the holder 24 maintains a fixed shape during operating conditions. The steps further include: attaching an audible signaling device 27 to the shock cord 20; positioning the apparatus about the user neck during operating conditions; and positioning at least one of the existing fishing pole and the existing binoculars within the holder 24.

In use, the method further includes the steps of: statically attaching a deformably resilient and cushioned material 25 to an inner surface of a selected curved portion of the holder 24; abutting the cushioned material 25 directly against, without the use of intervening characters, at least one of the existing fishing pole and the existing binoculars interfitted within the selected curved portion such that the cushioned material 25 prohibits the at least one fishing pole and the existing binoculars from prematurely and undesirably exiting the holder during operating conditions; and attaching another curved portion of the holder 24 to the loop of the shock cord 20 such that the loop 26 is interfitted within another curved portion and thereby maintains the cushioned material 25 of the selected curved portion in an upwardly facing position during operating conditions.

In use, the method further includes the steps of: directly attaching, without the use of intervening elements, a whistle to the first and second ends 21, 22 respectively of the shock cord 20; and employing the audible signaling device (whistle) when desired by the user.

In use, the method of further includes the step of providing a cylindrical barrel lock 31 with an open top end and a closed bottom end 33, 34 respectively. Such a barrel lock 31 has a hollow interior. The steps further include interfitting a piston 36 provided with a shaft 37 within the hollow interior of the barrel lock 31. Such a piston 36 is provided with a top end with a diameter that is equal to a diameter of the barrel lock 31, and the top end is monolithically formed with the shaft 37. The shaft 37 has a bore 35 formed therethrough, and such a bore 35 has a centrally registered axis oriented perpendicular to a longitudinal length of the shaft 37. The steps further include interfitting a deformably resilient spring member 39 within the hollow interior of the barrel lock 31. Such a spring member 39 has a bottom end 40 abutted directly against, without the use of intervening characters, the bottom end of the barrel lock 31 and further has a top end 41 extending upwardly and away from the bottom end thereof. The steps further include abutting the top end of the spring member 39 directly against, without the use of intervening characters, a bottom end of the piston when the piston is interfitted within the barrel lock 31.

In use, the method further includes the step of providing a pair of apertures 32 formed in diametrically opposed outer surfaces of the barrel lock 31. Such respective apertures 32 are located adjacent to the top end of the barrel lock 31. The steps further include: aligning each of the apertures 32 with the bore 35 when the piston 36 is interfitted within the barrel lock 31 such that the shock cord 20 is simultaneously penetrated through the apertures 32 and the bore 35 respectively; positioning the barrel lock 31 along a longitudinal length of the shock cord 20 during operating conditions; and prohibiting the barrel lock 31 from prematurely and undesirably sliding along the longitudinal length of the shock cord 20 during operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A portable fishing pole and binoculars support apparatus for assisting a user to support an existing fishing pole or an existing binoculars on a user body while allowing user hands to remain unencumbered, said fishing pole and binoculars support apparatus comprising:

a flexible shock cord having adjacently disposed first and second ends respectively, said shock cord further comprises a cable crimp directly attached thereto such that a loop is formed in a medial portion of said shock cord;

a substantially S-shaped holder removably secured to said shock cord, said holder comprises a deformably resilient and cushioned material statically affixed to an inner surface of a selected curved portion of said holder, said cushioned material for being abutted directly against an existing object interfitted within said selected curved portion such that said cushioned material prohibits at least one of the existing fishing pole and the existing binoculars from prematurely and undesirably exiting said holder during operating conditions, wherein another curved portion of said holder is attached to said loop of said shock cord such that said loop is interfitted within said another curved portion and thereby maintains said cushioned material of said selected curved portion in an upwardly facing position during operating conditions;

an audible signaling device attached to said shock cord, said audible signaling device comprises a whistle, said whistle comprising:

a female part directly attached to said first and second ends respectively of said shock cord, and a male part permanently attached to said female part, wherein said male part and said female part are employed as desired by the user to generate a whistling sound; and means for adjustably attaching said apparatus about a user neck during operating conditions, said attaching means being slidably attached to said shock cord.

2. The fishing pole and binoculars support apparatus of claim 1, wherein said means for adjustably attaching comprises:

a cylindrical barrel lock having an open top end and a closed bottom end respectively, said barrel lock having a hollow interior;

a piston having a shaft removably interfitted within said hollow interior of said barrel lock, said piston being provided with a top end having a diameter that is equal to a diameter of said barrel lock, said top end being monolithically formed with said shaft, said shaft having a bore formed therethrough, said bore having a centrally registered axis oriented perpendicular to a longitudinal length of said shaft; and a deformably resilient spring member interfitted within said hollow interior of said barrel lock, said spring member having a bottom end abutted directly against said bottom end of said barrel lock and further having a top end extending upwardly and away from said bottom end thereof, said top end of said spring member being abutted directly against a bottom end of said piston when said piston is interfitted within said barrel lock.

3. The fishing pole and binoculars support apparatus of claim 2, wherein said barrel lock further comprises:

a pair of apertures formed in diametrically opposed outer surfaces of said barrel lock, said respective apertures being located adjacent to said top end of said barrel lock, each of said apertures aligning with said bore when said piston is interfitted within said barrel lock such that said shock cord is simultaneously penetrated through said apertures and said bore respectively, said barrel lock being slidably adjusted along a longitudinal length of said shock cord during operating conditions;

wherein said spring member exerts a force against said bottom end of said piston and thereby causes said apertures and said bore to prohibit said barrel lock from prematurely and undesirably sliding along said longitudinal length of said shock cord during operating conditions.

4. A portable fishing pole and binoculars support apparatus for assisting a user to support an existing fishing pole and an existing binoculars on a user body while allowing user hands to remain unencumbered, said fishing pole and binoculars support comprising:

a flexible shock cord having adjacently disposed first and second ends respectively, wherein said shock cord further comprises a cable crimp directly attached thereto such that a loop is formed in a medial portion of said shock cord;

a substantially S-shaped holder removably secured to said shock cord, said holder being formed from rigid and durable material such that said holder maintains a fixed shape during operating conditions, said holder comprises a deformably resilient and cushioned material statically affixed to an inner surface of a selected curved portion of said holder, said cushioned material for being abutted directly against an existing object interfitted within said selected curved portion such that said cushioned material prohibits at least one of the existing fishing pole and the existing binoculars from prematurely and undesirably exiting said holder during operating conditions, wherein another curved portion of said holder is attached to said loop of said shock cord such that said loop is interfitted within said another curved portion and thereby maintains said cushioned material of said selected curved portion in an upwardly facing position during operating conditions;

an audible signaling device attached to said shock cord, wherein said audible signaling device comprises a whistle, said whistle comprising:

a female part directly attached to said first and second ends respectively of said shock cord, and a male part permanently attached to said female part, wherein said male part and said female part are employed as desired by the user to generate a whistling sound; and means for adjustably attaching said apparatus about a user neck during operating conditions, said attaching means being slidably attached to said shock cord.

5. The fishing pole and binoculars support apparatus of claim 4, wherein said means for adjustably attaching comprises:

a cylindrical barrel lock having an open top end and a closed bottom end respectively, said barrel lock having a hollow interior;

a piston having a shaft removably interfitted within said hollow interior of said barrel lock, said piston being provided with a top end having a diameter that is equal to a diameter of said barrel lock, said top end being monolithically formed with said shaft, said shaft having a bore formed therethrough, said bore having a centrally registered axis oriented perpendicular to a longitudinal length of said shaft; and a deformably resilient spring member interfitted within said hollow interior of said barrel lock, said spring member having a bottom end abutted directly against said bottom end of said barrel lock and further having a top end extending upwardly and away from said bottom end thereof, said top end of said spring member being abutted directly against a bottom end of said piston when said piston is interfitted within said barrel lock.

6. The fishing pole and binoculars support apparatus of claim 5, wherein said barrel lock further comprises:

a pair of apertures formed in diametrically opposed outer surfaces of said barrel lock, said apertures being located adjacent to said top end of said barrel lock, each of said apertures aligning with said bore when said piston is interfitted within said barrel lock such that said shock cord is simultaneously penetrated through said apertures and said bore respectively, said barrel lock being slidably adjusted along a longitudinal length of said shock cord during operating conditions;

wherein said spring member exerts a force against said bottom end of said piston and thereby causes said apertures and said bore to prohibit said barrel lock from prematurely and undesirably sliding along said longitudinal length of said shock cord during operating conditions.

7. A method for supporting an existing fishing pole and existing binoculars on a user body while allowing user hands to remain unencumbered, said method comprising the steps of:

a. providing a flexible shock cord having adjacently disposed first and second ends respectively, said shock cord further comprises a cable crimp directly attached thereto such that a loop is formed in a medial portion of said shock cord;
b. securing a substantially S-shaped holder to said shock cord, said holder being formed from rigid and durable material such that said holder maintains a fixed shape during operating conditions, wherein the step of securing a substantially S-shaped holder to said shock cord comprises the steps of:
  i. statically attaching a deformably resilient and cushioned material to an inner surface of a selected curved portion of said holder,
  ii. abutting said cushioned material directly against at least one of the existing fishing pole and the existing binoculars interfitted within said selected curved portion such that said cushioned material prohibits the at least one of the fishing pole and the existing binoculars from prematurely and undesirably exiting said holder during operating conditions,
  iii. attaching another curved portion of said holder to said loop of said shock cord such that said loop is interfitted within said another curved portion and thereby maintains said cushioned material of said selected curved portion in an upwardly facing position during operating conditions;
c. attaching an audible signaling device to said shock cord, wherein the step of attaching an audible signaling device to said shock cord comprises the steps of:
  i. directly attaching a whistle to said first and second ends respectively of said shock cord, said whistle comprising a female part directly attached to said first and second ends respectively of said shock cord and a male part permanently attached to said female part, wherein said male part and said female part are employed as desired by the user to generate a whistling sound, and
  ii. employing said whistle when desired by the user and thereby generating a whistle sound;
d. positioning said apparatus about the user's neck during operating conditions; and
e. positioning at least one of the existing fishing pole and the existing binoculars within said holder.

8. The method of claim 7, wherein step d. comprises the steps of,
  i. providing a cylindrical barrel lock having an open top end and a closed bottom end respectively, said barrel lock having a hollow interior;
  ii. interfitting a piston provided with a shaft within said hollow interior of said barrel lock, said piston being provided with a top end having a diameter that is equal to a diameter of said barrel lock, said top end being monolithically formed with said shaft, said shaft having a bore formed therethrough, said bore having a centrally registered axis oriented perpendicular to a longitudinal length of said shaft;
  iii. interfitting a deformably resilient spring member within said hollow interior of said barrel lock, said spring member having a bottom end abutted directly against said bottom end of said barrel lock and further having a top end extending upwardly and away from said bottom end thereof; and
  iv. abutting said top end of said spring member directly against a bottom end of said piston when said piston is interfitted within said barrel lock.

9. The method of claim 8, wherein step d. further comprises the steps of:
  v. providing a pair of apertures formed in diametrically opposed outer surfaces of said barrel lock, said apertures being located adjacent to said top end of said barrel lock;
  vi. aligning each of said apertures with said bore when said piston is interfitted within said barrel lock such that said shock cord is simultaneously penetrated through said apertures and said bore respectively;
  vii. positioning said barrel lock along a longitudinal length of said shock cord during operating conditions; and
  viii. prohibiting said barrel lock from prematurely and undesirably sliding along said longitudinal length of said shock cord during operating conditions.

\* \* \* \* \*